United States Patent
Hirano

(10) Patent No.: US 9,169,339 B2
(45) Date of Patent: Oct. 27, 2015

(54) CURABLE COMPOSITION, MOLDED PRODUCT AND METHOD FOR PRODUCING MOLDED PRODUCT

(75) Inventor: Seiichi Hirano, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 159 days.

(21) Appl. No.: 13/876,748

(22) PCT Filed: Nov. 25, 2011

(86) PCT No.: PCT/JP2011/077883
§ 371 (c)(1),
(2), (4) Date: Mar. 28, 2013

(87) PCT Pub. No.: WO2012/077583
PCT Pub. Date: Jun. 14, 2012

(65) Prior Publication Data
US 2013/0190456 A1   Jul. 25, 2013

Related U.S. Application Data

(60) Provisional application No. 61/420,723, filed on Dec. 7, 2010.

(51) Int. Cl.
*C08F 14/26* (2006.01)
*C08L 27/18* (2006.01)
*B29C 71/02* (2006.01)
*C08K 5/23* (2006.01)

(52) U.S. Cl.
CPC ............... *C08F 14/26* (2013.01); *B29C 71/02* (2013.01); *C08L 27/18* (2013.01); *C08K 5/23* (2013.01); *C08L 2205/02* (2013.01)

(58) Field of Classification Search
None
See application file for complete search history.

(56) References Cited

U.S. PATENT DOCUMENTS

| 5,565,512 A | 10/1996 | Saito et al. | |
|---|---|---|---|
| 2004/0239008 A1* | 12/2004 | Gottlieb et al. | 264/494 |
| 2010/0144948 A1 | 6/2010 | Hirano | |
| 2011/0112265 A1* | 5/2011 | Washino et al. | 526/213 |

FOREIGN PATENT DOCUMENTS

| CN | 101330149 | * | 12/2008 |
|---|---|---|---|
| JP | 9-77897 A | | 3/1997 |
| JP | 9-111081 A | | 4/1997 |
| JP | 2004-256565 A | | 9/2004 |
| WO | 009603 A1 | | 2/2000 |
| WO | WO 00/09603 | * | 2/2000 |
| WO | 2007013397 A1 | | 2/2007 |
| WO | 2010/002013 A1 | | 1/2010 |
| WO | WO 2010/002013 | * | 1/2010 |

OTHER PUBLICATIONS

Computer translation of CN 101330149 (2012).*
International Report on Patentability and Written Opinion of the International Searching Authority for PCT Appln. No. PCT/JP2011/077883 issued Jun. 12, 2013.
International Search Report for PCT/JP2011/077883 dated Feb. 21, 2012.

* cited by examiner

*Primary Examiner* — Robert C Boyle
(74) *Attorney, Agent, or Firm* — Sughrue Mion, PLLC

(57) ABSTRACT

The present invention aims to provide a curable composition excellent in storage stability and scorch resistance. The present invention provides a curable composition including a fluoroelastomer (A) that contains a cyano group in a main chain and/or a side chain thereof, and a compound (B) that is at least one compound selected from the group consisting of an amide compound and a hydrazide compound, the compound (B) having at least one structure selected from the group consisting of azo structure, hydrazine structure, and imine structure, and producing $NH_3$ when decomposed.

6 Claims, No Drawings

CURABLE COMPOSITION, MOLDED PRODUCT AND METHOD FOR PRODUCING MOLDED PRODUCT

CROSS-REFERENCE TO RELATED APPLICATIONS

This application is a National Stage of PCT/JP2011/077883 filed Nov. 25, 2011 claims claiming benefit under 35 U.S.C. §119(e) of U.S. Provisional Application No. 61/420,723 filed Dec. 7, 2010, incorporated herein by reference in its entirety.

TECHNICAL FIELD

The present invention relates to a curable composition, a molded product, and a method for producing a molded product.

BACKGROUND ART

Curable compositions containing a fluoroelastomer have excellent properties such as heat resistance, chemical resistance, solvent resistance, and fuel resistance, and are therefore widely used for production of molded products such as O-rings, hoses, valve stem seals, shaft seals, and diaphragms.

However, stricter demands have been placed on the properties of those various molded products as the technology has progressed; that is, molded products are desired which have higher properties than those obtained by conventionally employed peroxide cross-linking or polyol cross-linking.

In view of such a state of the art, curable compositions cross-linkable by triazine cross-linking have been proposed. For example, Patent Document 1 discloses a fluoroelastomer composition obtained by blending an organic acid ammonium salt or inorganic acid ammonium salt as a curing agent with a ternary copolymer of tetrafluoroethylene, perfluoro (lower alkyl vinyl ether) or perfluoro(lower alkoxy-lower alkyl vinyl ether), and a cyano group-containing perfluoro vinyl ether.

Patent Document 2 discloses a curable composition including a perfluoroelastomer of tetrafluoroethylene, a specific perfluoro vinyl ether, and a cure site monomer, and a compound that is other than an organic acid ammonium salt or an inorganic acid ammonium salt and produces ammonia when decomposed at 40° C. to 330° C.

Patent Document 3 discloses a curable composition that includes a fluoroelastomer containing a cyano group in a main chain and/or a side chain thereof and inorganic nitride particles, and the amount of the inorganic nitride particles is 0.1 to 20 parts by weight for each 100 parts by weight of the fluoroelastomer.

Patent Document 1: JP 9-111081 A
Patent Document 2: WO 00/09603 A
Patent Document 3: WO 2007/013397 A

SUMMARY OF THE INVENTION

However, those compositions of Patent Documents 1 to 3 are sometimes scorched, and therefore can be further improved in terms of storage stability.

The present invention has been made in view of the above state of the art, and aims to provide a curable composition excellent in scorch resistance and storage stability.

One aspect of the present invention is a curable composition including a fluoroelastomer (A) that contains a cyano group in a main chain and/or a side chain thereof, and a compound (B) that is at least one compound selected from the group consisting of an amide compound and a hydrazide compound, the compound (B) having at least one structure selected from the group consisting of azo structure, hydrazine structure, and imine structure, and producing $NH_3$ when decomposed.

The compound (B) preferably has a decomposition temperature of 180° C. to 300° C.

The curable composition preferably contains 0.1 to 20 parts by weight of the compound (B) for each 100 parts by weight of the fluoroelastomer (A).

The compound (B) is preferably at least one compound selected from the group consisting of a compound represented by the following formula (1):

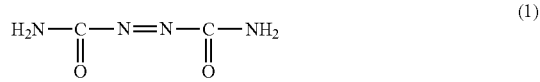

and a compound represented by the following formula (2):

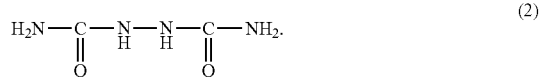

Another aspect of the present invention is a molded product produced by cross-linking the above curable composition.

Yet another aspect of the present invention is a method for producing a molded product, comprising the steps of primarily vulcanizing the above curable composition, and secondary vulcanizing the primarily vulcanized curable composition.

The primary vulcanization is preferably performed at a temperature of 140° C. to 230° C., and the secondary vulcanization is performed at a temperature of 200° C. to 320° C.

EFFECT OF THE INVENTION

The curable composition of the present invention, having the above structure, is excellent in storage stability and scorch resistance. Also, a molded product obtained by cross-linking the curable composition of the present invention is cross-linked by triazine crosslinking, and is therefore excellent in compression set and heat resistance. Such a molded product is also excellent in oxygen radical resistance and ozone resistance.

MODES FOR CARRYING OUT THE INVENTION

The curable composition of the present invention includes a fluoroelastomer (A) that contains a cyano group in a main chain and/or a side chain thereof, and a compound (B) that is at least one compound selected from the group consisting of an amide compound and a hydrazide compound.

The fluoroelastomer (A) is not particularly limited as long as it has a cyano group (—CN group) in a main chain and/or a side chain thereof.

The fluoroelastomer (A) is cross-linked by reaction with the compound (B) where cyano groups are cyclotrimerized to form triazine rings. A molded product obtained by cross-linking the curable composition of the present invention is accordingly excellent in compression set and heat resistance. The molded product is also excellent in oxygen radical resistance and ozone resistance.

Examples of the fluoroelastomer (A) include perfluoro fluororubbers and non-perfluoro fluororubbers. The fluoroelastomer (A) is preferably a perfluoro fluororubber. Here, a perfluoro fluororubber refers to a rubber in which polymerization units derived from perfluoro monomers constitute not less than 90 mol % of the polymerization units derived from monomers.

The perfluoro fluororubber is preferably a polymer of tetrafluoroethylene [TFE]/a perfluoro(alkyl vinyl ether) [PAVE]/a monomer containing a cyano group. The composition of TFE/PAVE is preferably 50 to 90/10 to 50 mol %, more preferably 50 to 80/20 to 50 mol %, and still more preferably 55 to 75/25 to 45 mol %. The amount of the polymerization unit derived from a monomer containing a cyano group is preferably 0.1 to 5 mol %, and more preferably 0.3 to 3 mol %, relative to the total amount of the polymerization unit derived from TFE and the polymerization unit derived from PAVE, in terms of good cross-linking properties and good heat resistance.

Examples of the PAVE include perfluoro(methyl vinyl ether) [PMVE] and perfluoro(propyl vinyl ether) [PPVE]. Each of the PAVEs may be used alone, or two or more of the PAVEs may be used in combination.

Examples of the monomer containing a cyano group include the cyano group-containing monomers disclosed in JP 4-505345 T and JP 5-500070 T, and monomers represented by the following formulas (3) to (19).

Examples of monomers containing a cyano group include monomers represented by the following formulas (3) to (19).

$$CY^1_2=CY^1(CF_2)_n-CN \quad (3)$$

(wherein $Y^1$ represents a hydrogen atom or a fluorine atom, and n represents an integer of 1 to 8)

$$CF_2=CFCF_2Rf^2-CN \quad (4)$$

(wherein $Rf^2$ is a divalent group represented by $-(OCF_2)_n-$ or $-(OCF(CF_3))_n-$, and n is an integer of 0 to 5)

$$CF_2=CFCF_2(OCF(CF_3)CF_2)_m(OCH_2CF_2CF_2)_n OCH_2CF_2-CN \quad (5)$$

(wherein m is an integer of 0 to 5, and n is an integer of 0 to 5)

$$CF_2=CFCF_2(OCH_2CF_2CF_2)_m(OCF(CF_3)CF_2)_nOCF(CF_3)-CN \quad (6)$$

(wherein m is an integer of 0 to 5, and n is an integer of 0 to 5)

$$CF_2=CF(OCF_2CF(CF_3))_mO(CF_2)_n-CN \quad (7)$$

(wherein m is an integer of 0 to 5, and n is an integer of 1 to 8)

$$CF_2=CF(OCF_2CF(CF_3))_m-CN \quad (8)$$

(wherein m is an integer of 1 to 5)

$$CF_2=CFOCF_2(CF(CF_3)OCF_2)_nCF(-CN)CF_3 \quad (9)$$

(wherein n is an integer of 1 to 4)

$$CF_2=CFO(CF_2)_nOCF(CF_3)-CN \quad (10)$$

(wherein n is an integer of 2 to 5)

$$CF_2=CFO(CF_2)_n-(C_6H_4)-CN \quad (11)$$

(wherein n is an integer of 1 to 6)

$$CF_2=CF(OCF_2CF(CF_3))_nOCF_2CF(CF_3)-CN \quad (12)$$

(wherein n is an integer of 1 or 2)

$$CH_2=CFCF_2O(CF(CF_3)CF_2O)_nCF(CF_3)-CN \quad (13)$$

(wherein n is an integer of 0 to 5)

$$CF_2=CFO(CF_2CF(CF_3)O)_m(CF_2)_n-CN \quad (14)$$

(wherein m is an integer of 0 to 5, and n is an integer of 1 to 3)

$$CH_2=CFCF_2OCF(CF_3)OCF(CF_3)-CN \quad (15)$$

$$CH_2=CFCF_2OCH_2CF_2-CN \quad (16)$$

$$CF_2=CFO(CF_2CF(CF_3)O)_mCF_2CF(CF_3)-CN \quad (17)$$

(wherein m is an integer not smaller than 0)

$$CF_2=CFOCF(CF_3)CF_2O(CF_2)_n-CN \quad (18)$$

(wherein n is an integer not smaller than 1)

$$CF_2=CFOCF_2OCF_2CF(CF_3)OCF_2-CN \quad (19)$$

These monomers may be used independently from each other, or in any combination with each other. The monomer containing a cyano group is preferably at least one monomer selected from the group consisting of the monomers represented by the above formulas (3) to (19).

Among these, the monomer represented by formula (7) or (14) is more preferable, and $CF_2=CFOCF_2CF(CF_3)OCF_2CF_2CN$ is still more preferable.

The monomers represented by formulas (3) to (19) each having a cyano group are triazine cross-linked by cyclotrimerization of the cyano group.

The cyano group can also be introduced by the method disclosed in WO 00/05959.

Specific examples of the perfluoro fluororubber include fluororubbers disclosed in, for example, WO 97/24381, JP 61-57324 B, JP 4-81608 B, and JP 5-13961 B.

Examples of the non-perfluoro fluororubber include vinylidene fluoride (VdF) fluororubber, tetrafluoroethylene (TFE)/propylene fluororubber, tetrafluoroethylene (TFE)/propylene/vinylidene fluoride (VdF) fluororubber, ethylene/hexafluoropropylene (HFP) fluororubber, ethylene/hexafluoropropylene (HFP)/vinylidene fluoride (VdF) fluororubber, ethylene/hexafluoropropylene (HFP)/tetrafluoroethylene (TFE) fluororubber, fluorosilicone elastomer, and fluorophosphazene elastomer. These non-perfluoro fluororubbers may be used independently from each other, or in any combination with each other to the extent that does not deteriorate the effect of the present invention.

A vinylidene fluoride fluororubber is formed from 45 to 85 mol % of vinylidene fluoride, 55 to 15 mol % of at least one other monomer copolymerizable with the vinylidene fluoride, and 0.5 to 5 mol % of a monomer containing a cyano group, relative to the total amount of the vinylidene fluoride and the at least one other monomer copolymerizable with the vinylidene fluoride.

Preferably, the vinylidene fluoride fluororubber is a fluorocopolymer formed from 50 to 80 mol % of vinylidene fluoride, 50 to 20 mol % of at least one other monomer copolymerizable with the vinylidene fluoride, and 0.1 to 5 mol % of a monomer containing a cyano group, relative to the total amount of the vinylidene fluoride and the at least one other monomer copolymerizable with the vinylidene fluoride. The amount of the monomer containing a cyano group is preferably not less than 0.2 mol %, and more preferably not less than 0.3 mol %, in terms of improving cross-linkability of the fluoroelastomer (A). On the other hand, the amount of the monomer containing a cyano group is preferably not more than 2.0 mol %, more preferably not more than 1.0 mol %, and still more preferably not more than 0.5 mol %, in terms of reducing the amount of the monomer containing a cyano group, which is generally expensive.

Examples of the at least one other monomer copolymerizable with vinylidene fluoride include fluoromonomers such as tetrafluoroethylene (TFE), chlorotrifluoroethylene (CTFE), trifluoroethylene, hexafluoropropylene (HFP), trifluoropropylene, tetrafluoropropylene, pentafluoropropylene, trifluorobutene, tetrafluoroisobutene, perfluoro(alkyl vinyl ethers) (PAVEs), and vinyl fluoride, and non-fluoro monomers such as ethylene, propylene, and alkyl vinyl ether. These monomers may be used independently from each other, or in any combination with each other. Among these, at least one monomer selected from the group consisting of tetrafluoroethylene, hexafluoropropylene, and perfluoro(alkyl vinyl ethers) is preferable.

Specific examples of the rubber include VdF-HFP rubber, VdF-HFP-TFE rubber, VdF-CTFE rubber, and VdF-CTFE-TFE rubber.

Tetrafluoroethylene/propylene fluororubber refers to a fluorocopolymer formed from 45 to 70 mol % of tetrafluoroethylene, 55 to 30 mol % of propylene, and 0.1 to 5 mol % of a monomer containing a cyano group, relative to the total amount of the tetrafluoroethylene and the propylene. The amount of the monomer containing a cyano group is preferably not less than 0.2 mol %, and more preferably not less than 0.3 mol %, in terms of improving cross-linkability of the fluoroelastomer (A). On the other hand, the amount of the monomer containing a cyano group is preferably not more than 2.0 mol %, more preferably not more than 1.0 mol %, and still more preferably not more than 0.5 mol %, in terms of reducing the amount of the monomer containing a cyano group, which is generally expensive.

The fluoroelastomer (A) may be a thermoplastic fluororubber including elastomeric fluoropolymer chain segments and non-elastomeric fluoropolymer chain segments, or a rubber composition containing the above fluororubber and the thermoplastic fluororubber.

The perfluoro fluororubber and non-perfluoro fluororubber can be produced by a common method.

The method of isolating the polymerization product from the obtained polymerization reaction mixture is preferably coagulation by acid treatment in terms of simplification of the process. Alternatively, the method may be one including acidizing the polymerization mixture, and isolating the polymerization product by lyophilization or the like. The coagulation may be performed by supersonic wave, mechanical power, or the like.

The curable composition of the present invention includes a compound (B) that is at least one compound selected from the group consisting of an amide compound and a hydrazide compound, the compound (B) having at least one structure selected from the group consisting of azo structure, hydrazine structure, and imine structure, and producing $NH_3$ when decomposed. The compound (B) may be a combination of two or more compounds.

The compound (B) has at least one structure selected from the group consisting of azo structure (—N=N—), hydrazine structure (—NH—NH—), and imine structure (—N=C—). Since the compound (B) has the above structure and produces $NH_3$ when decomposed, a molded product obtained from the curable composition of the present invention is excellent in compression set and heat resistance. Such a molded product is also excellent in oxygen radical resistance and ozone resistance.

The compound (B) acts on the cyano groups in the fluoroelastomer such that the cyano groups are cyclotrimerized to allow the triazine cross-linking reaction to proceed.

The compound (B) preferably has a decomposition temperature of 180° C. to 300° C. The compound (B) more preferably has a decomposition temperature of 180° C. to 250° C., and still more preferably 180° C. to 210° C. A decomposition temperature in the above range gives better storage stability and better scorch resistance to the curable composition.

The decomposition temperature of the compound (B) is the decomposition starting temperature (1% weight loss temperature) determined by thermogravimetric (TG) analysis at a heating rate of 5° C./min in the air.

The curable composition preferably contains 0.1 to 20 parts by weight, more preferably 0.2 to 5 parts by weight, and still more preferably 0.2 to 1 part by weight of the compound (B) for each 100 parts by weight of the fluoroelastomer (A). Too small an amount of the compound (B) decreases the vulcanization density, which may give insufficient heat resistance and chemical resistance. Too large an amount thereof may decrease the normal physical properties (elongation, strength).

The compound (B) produces $NH_3$ when decomposed. The compound (B) may produce gas other than $NH_3$ when decomposed. For example, the compound (B) may produce carbon monoxide, carbon dioxide, or nitrogen. The compound (B) preferably produces ammonia gas and gas other than $NH_3$ in a total amount of 5 to 500 ml/g, and more preferably 5 to 300 ml/g. Further, the compound (B) preferably produces ammonia gas in an amount of 5 to 200 ml/g, and more preferably 5 to 100 ml/g.

The gas production amount is the amount measured upon heating of the compound for 30 minutes at the decomposition temperature of the compound.

Examples of the compound (B) include the compounds represented by the following formulas.

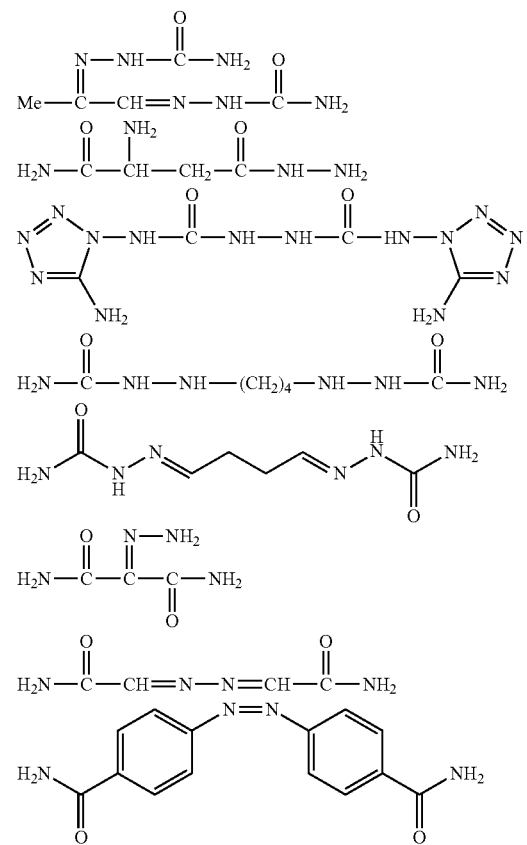

7
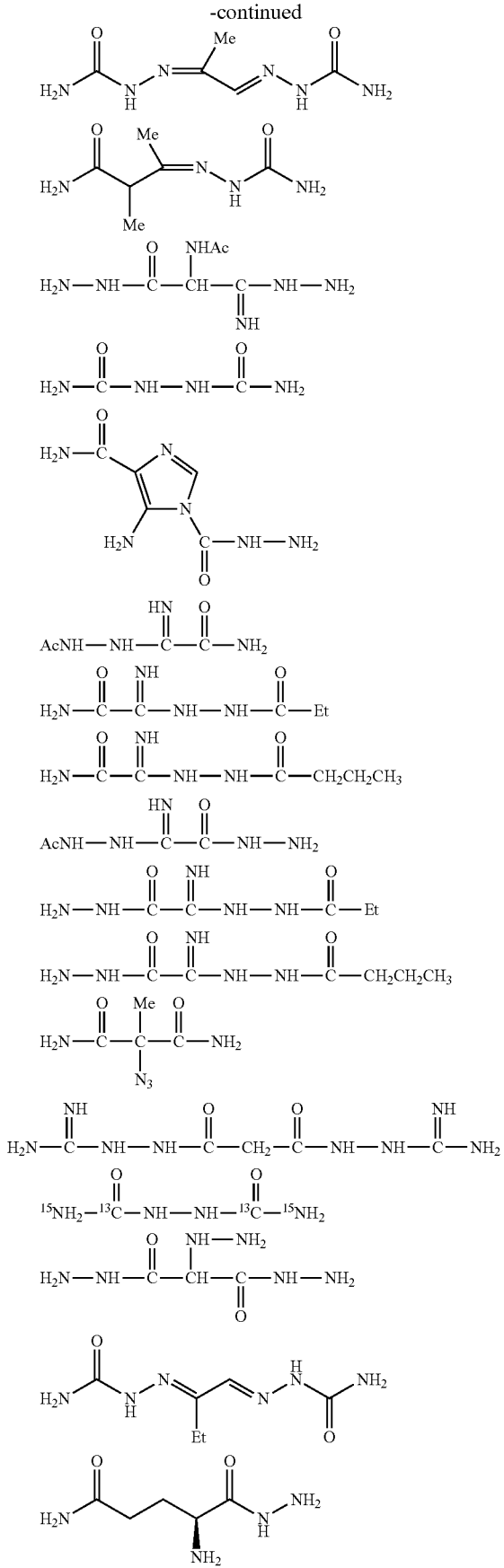
8
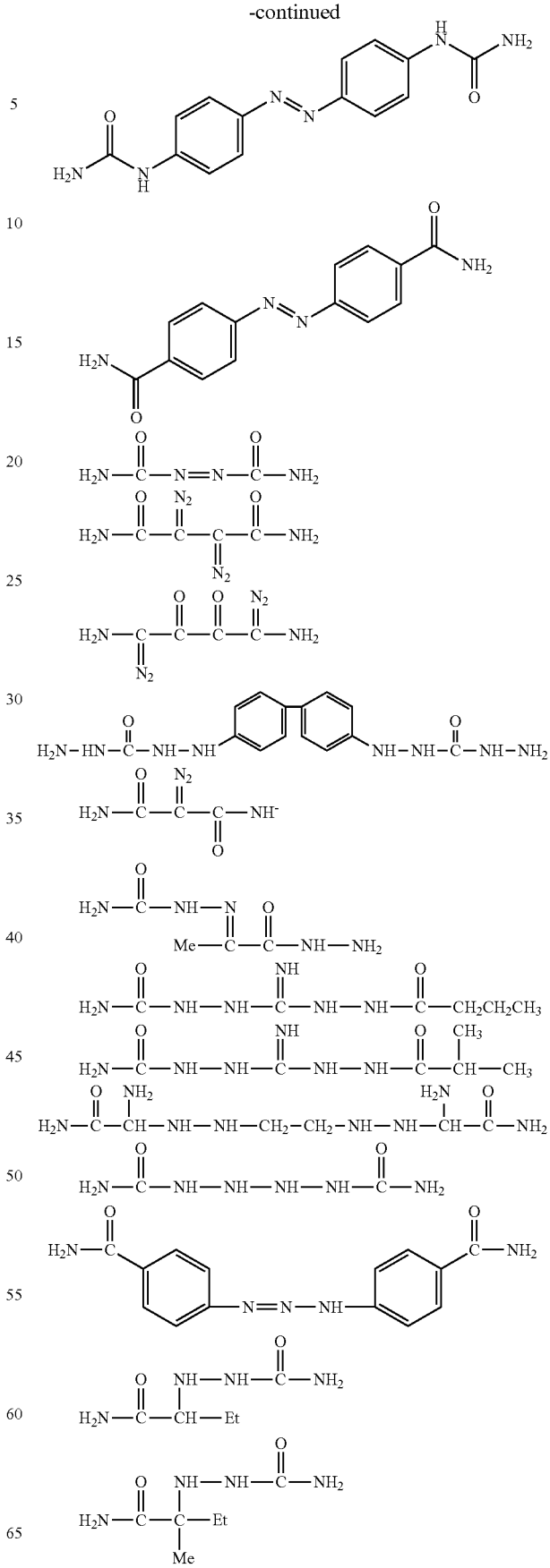

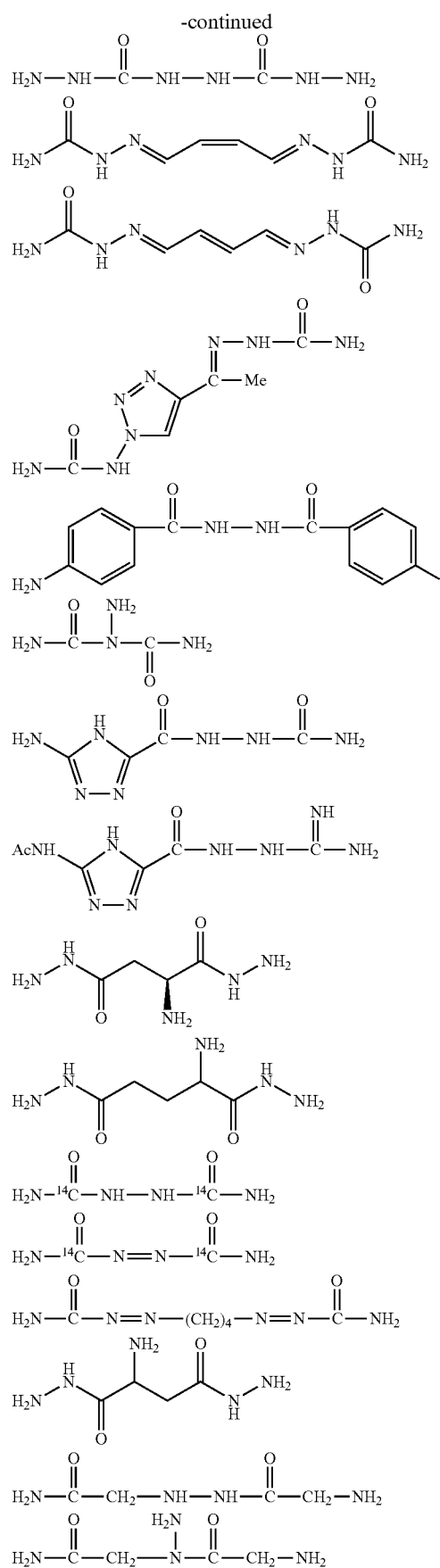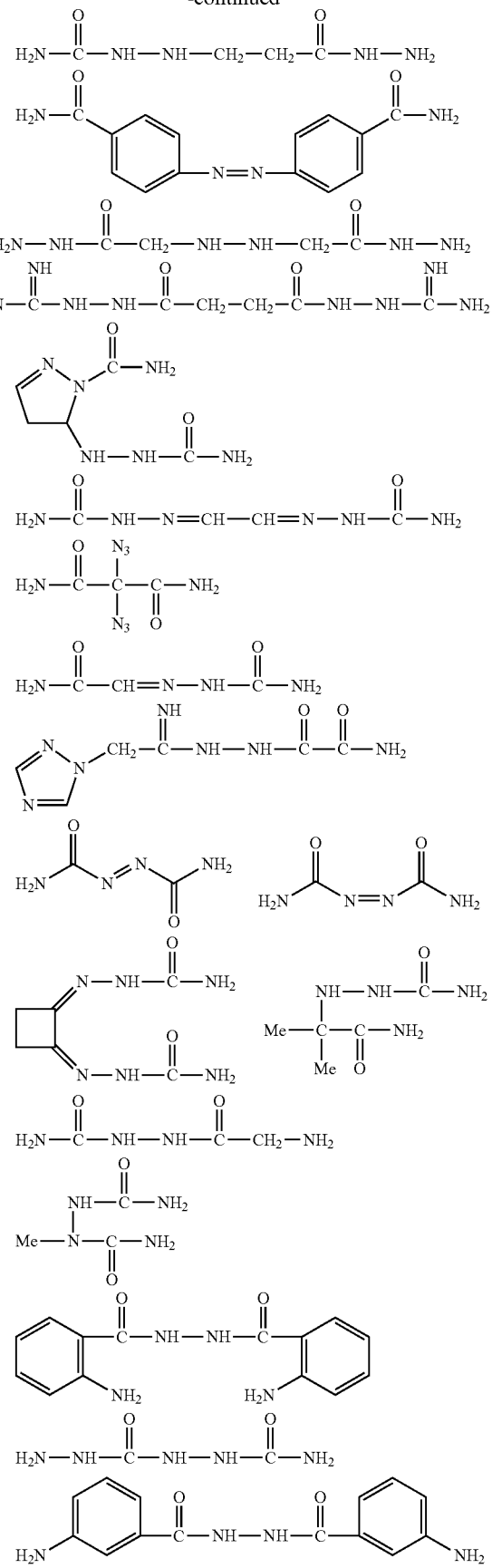

11
-continued
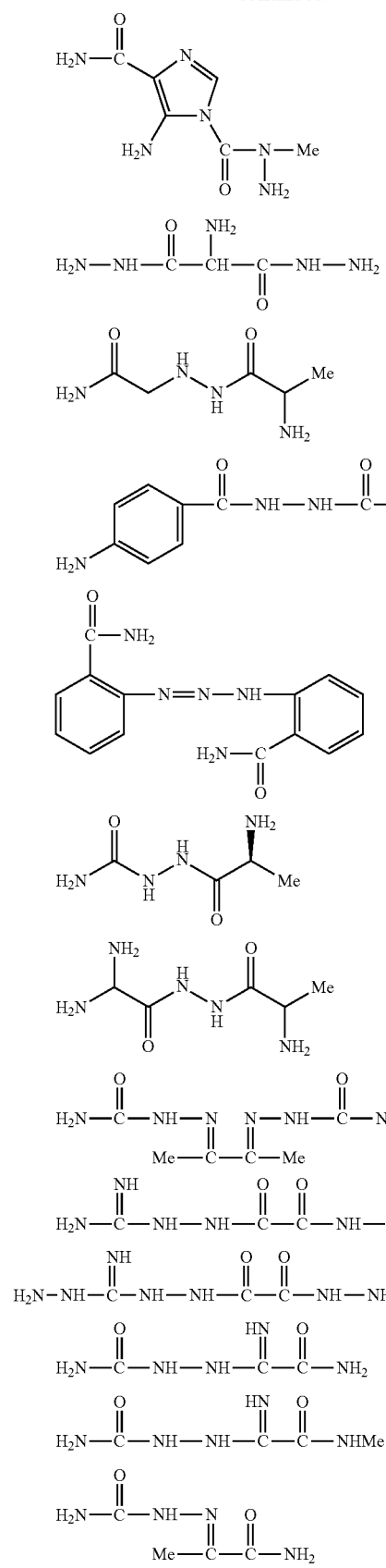
12
-continued
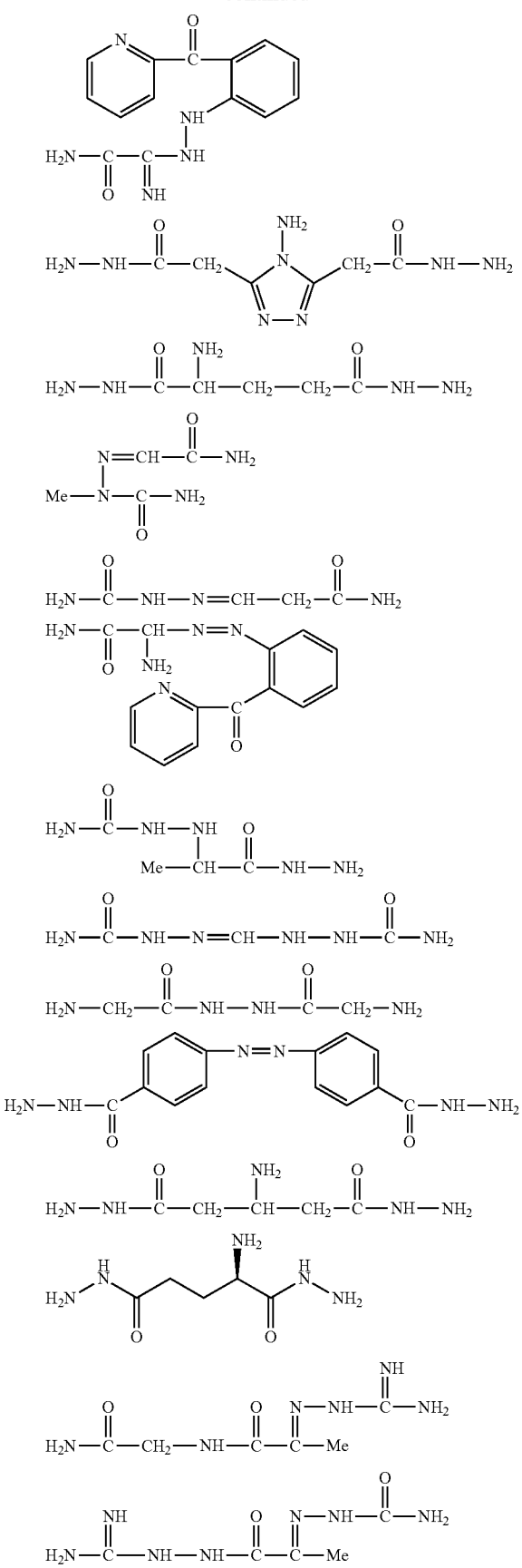

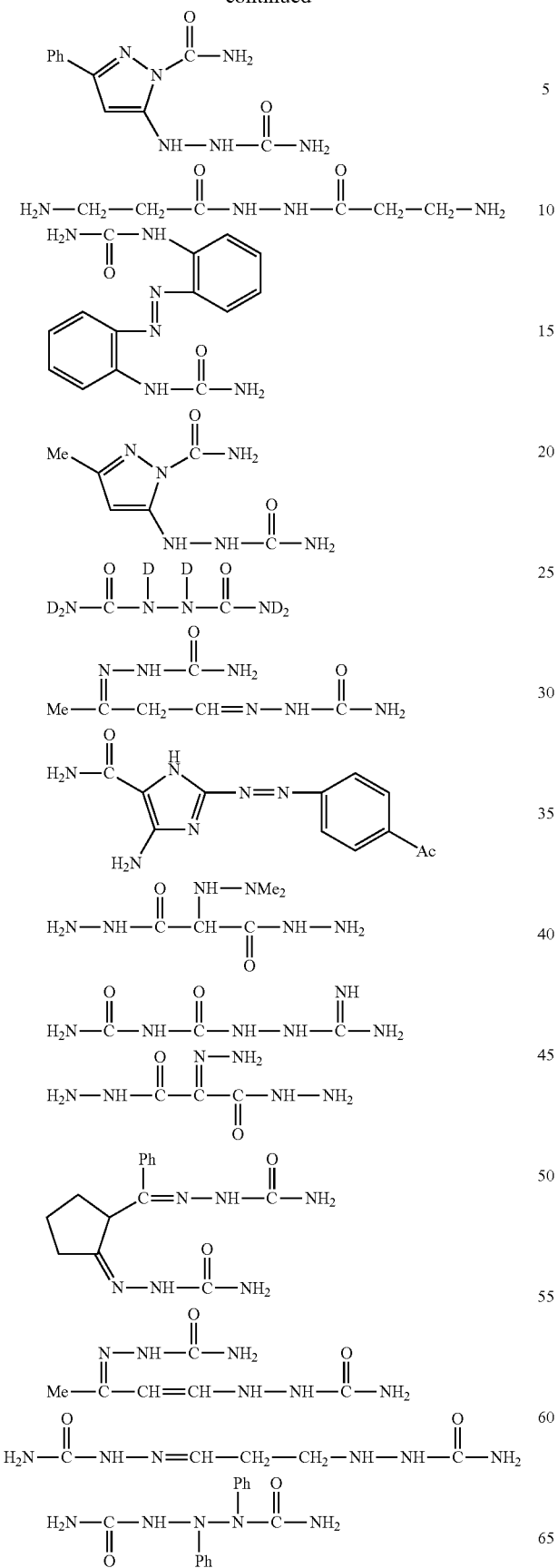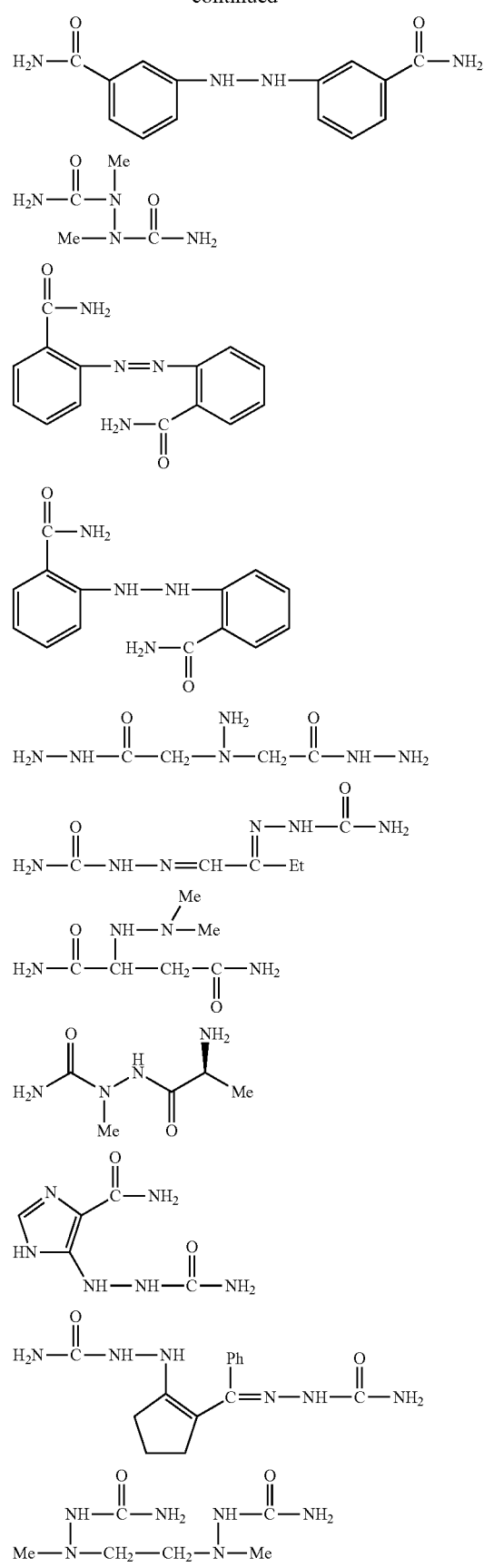

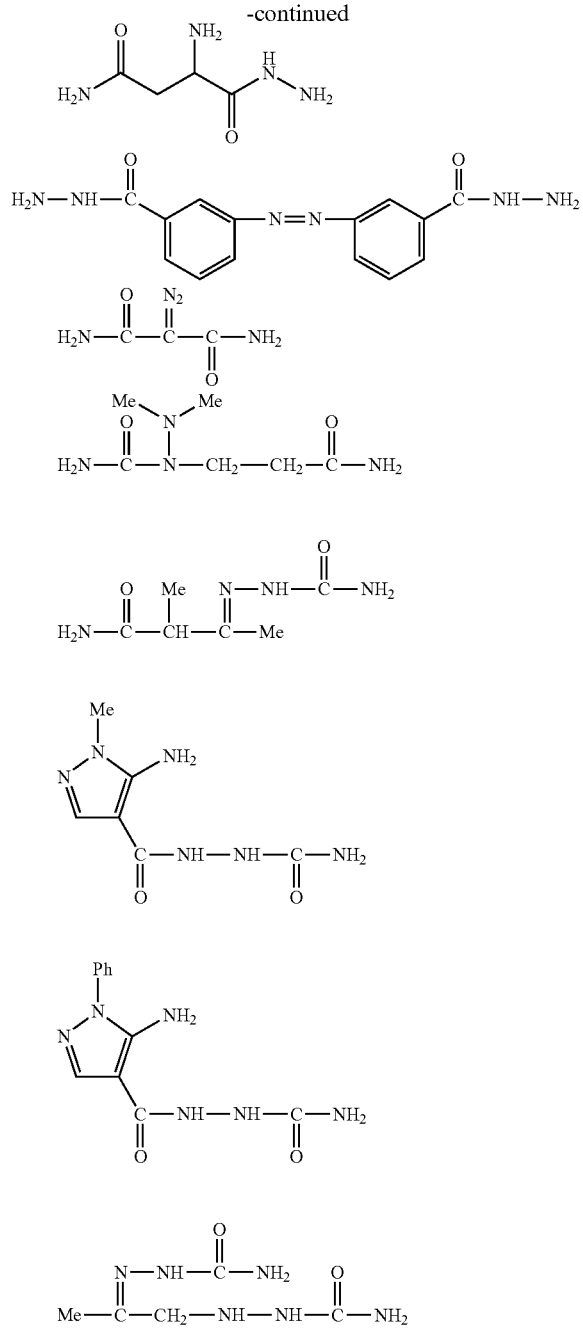

In the above formulas representing exemplary compounds of the compound (B), Me represents a methyl group, Et represents an ethyl group, Ac represents an acetyl group, and Ph represents a phenyl group.

Among these compounds, the compound (B) is preferably at least one compound selected from the group consisting of azodicarbonamide (ADCA) represented by the following formula (1):

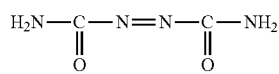

and hydrazodicarbonamide (HDCA) represented by the following formula (2):

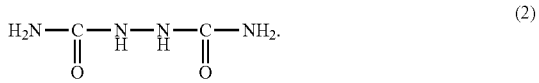

The compound (B) is more preferably ADCA. If the compound (B) is ADCA, the curable composition of the present invention has better storage stability and scorch resistance. The decomposition temperature of ADCA can be adjusted if the curable composition contains an aid such as urea.

Here, use of a cross-linking agent is not required because the curable composition of the present invention is cross-linked without a cross-linking agent. The triazine cross-linking without a cross-linking agent enables to suppress coloring of a molded product produced by cross-linking the curable composition. Still, if necessary, the curable composition of the present invention may contain a cross-linking agent.

The curable composition of the present invention may optionally contain common additives contained in curable compositions, such as a filler, a processing aid, a plasticizer, a colorant, a stabilizer, and a bonding aid, in the case that the curable composition is used in fields which do not particularly require high purity and non-contamination properties.

The curable composition of the present invention preferably has a scorch time (TS2) of not shorter than two minutes, and more preferably not shorter than three minutes. Also, the curable composition preferably has an optimum vulcanization time (T90) of not longer than 30 minutes, and more preferably not longer than 20 minutes. Too short a TS2 may possibly cause wrinkles on the surface of the molded product or cause distortion.

The scorch time (TS2) shows the time it takes for the torque to exceed the minimum viscosity (ML) by 2.0 dNm on the vulcanization curve at 200° C. determined by a moving die rheometer (Alpha Technologies).

Components of the curable composition of the present invention can be mixed by a common elastomer processing machine such as an open mill, a Banbury mixer, and a kneader so as to be formed into the curable composition. The curable composition can alternatively be prepared by a method using an enclosed mixer.

Another aspect of the present invention is a method for producing a molded product, including the steps of primarily vulcanizing the curable composition, and secondary vulcanizing the primarily vulcanized curable composition.

The method for producing a molded product according to the present invention may include the step of obtaining the above curable composition by mixing the fluoroelastomer (A) and the compound (B).

The method of obtaining a molded product from a curable composition may be a method of heat-compressing the curable composition in a die; a method of pressing the composition into a heated die; or a method of extruding the curable composition by an extruder, primarily vulcanizing the extruded composition, and lastly, secondary vulcanizing the composition.

The primary vulcanization is preferably performed at 140° C. to 230° C. for 5 to 120 minutes, more preferably at 150° C. to 220° C. for 5 to 120 minutes, and still more preferably at 170° C. to 210° C. for 5 to 60 minutes. The vulcanization may be performed by a known vulcanization method such as press cross-linking.

The secondary vulcanization is preferably performed at 180° C. to 320° C. for 2 to 24 hours, more preferably at 200° C. to 320° C. for 2 to 24 hours, and still more preferably at 200° C. to 300° C. for 5 to 20 hours. The vulcanization may be performed by a known vulcanization method such as oven cross-linking.

A molded product can be obtained by cross-linking the curable composition. Yet another aspect of the present invention is a molded product obtained by cross-linking the curable composition. A molded product obtained by cross-linking the curable composition of the present invention is cross-linked by triazine cross-linking, and thus is excellent in compression set and heat resistance. Such a molded product is also excellent in oxygen radical resistance and ozone resistance.

Since the curable composition has excellent scorch resistance, a molded product obtained by cross-linking the curable composition has excellent compression set even if the curable composition is stored for a long period of time.

The molded product of the present invention is useful as various molded products in various fields such as ones listed below.

In the fields relating to semiconductor-related products, e.g. semiconductor producing devices, liquid crystal panel producing devices, plasma panel producing devices, plasma-addressed liquid crystal panels, field emission display panels, and solar battery substrates, examples of the molded product include items such as O (square)-rings, packings, sealing materials, tubes, rolls, coatings, linings, gaskets, diaphrams, and hoses. These items can be used for devices such as CVD devices, dry etching devices, wet etching devices, oxidation diffusion devices, sputtering devices, asking devices, washing devices, ion implanting devices, gas discharging devices, chemical piping, and gas piping. More specific examples of the molded product include O-rings and sealing materials for gate valves, O-rings and sealing materials for quartz windows, O-rings and sealing materials for chambers, O-rings and sealing materials for gates, O-rings and sealing materials for bell jars, O-rings and sealing materials for couplings, O-rings, sealing materials and diaphragms for pumps, O-rings and sealing materials for semiconductor gas control devices, O-rings and sealing materials for resist developers and peeling liquids, hoses and tubes for wafer cleaning liquids, rolls for wafer conveyance, linings and coatings for resist developer vessels and peeling liquid vessels, linings and coatings for wafer cleaning liquid vessels, and linings and coatings for wet etching vessels. The molded product can also be used as an encapsulant, a sealing material, a coating material of quartz for optical fibers; a potting material, coating material, or adhesive seal of electric components and circuit boards for insulation, vibration proofing, waterproofing, and moisture-proofing; a gasket for magnetic storage devices; a modifying material for encapsulants, such as epoxy; or a sealant for clean rooms and clean equipment.

The molded product can also be used in a wide range of fields such as fields of automobiles, aircrafts, rockets, boats and ships, chemical products (e.g. plants), medical products (e.g. drugs), photographing (e.g. developing machines), printing (e.g. printing machines), coating (e.g. coating facility), analysis/physical and chemical appliances, food plant appliances, nuclear plant appliances, steels (e.g. steel plate processing equipment), general industries, electrics, fuel cells, electronic components, and forming in place.

EXAMPLES

Hereinafter, the present invention will be described in more detail based on examples and comparative examples. The examples are not intended to limit the scope of the present invention.

Evaluation Method
<Standard Vulcanization Conditions>
Mixing method: roll mixing
Press vulcanization: 30 minutes at 200° C. (Example 1) or 30 minutes at 180° C. (Comparative Example 1)
Oven vulcanization: 18 hours at 290° C. (temperature increased from 200° C.)
<Vulcanization Properties>

In the primary press vulcanization, the vulcanization curve was determined using a moving die rheometer (Alpha Technologies, MDR2000) so that the minimum viscosity (ML), maximum torque level (MH), scorch time (TS2) and optimum vulcanization time (T90) were determined. Also, occurrence of distortion (scorching) in the molded product was examined.

In Example 1, the vulcanization curve at 200° C. was obtained for evaluation, and the vulcanization curve at 180° C. was obtained in Comparative Example 1. The time it took for the torque to exceed the ML by 2.0 dNm on the vulcanization curve was set as the scorch time (TS2).
<Determination of Occurrence of Scorching and Storage Stability>

The occurrence of scorching was determined by storing the curable composition for 10 days at a temperature of 23° C. and a humidity of 45 to 55% and measuring the vulcanization properties. Here, it was determined that the composition was scorched if TS2 was shorter by not less than 20% than that determined before the storage, and ML was observed to increase.
<Decomposition Temperature>

The decomposition temperature was the decomposition starting temperature (1% weight loss temperature) determined by thermogravimetric (TG) analysis at a heating rate of 5° C./min in the air.

Preparation Example 1

A 6-L stainless steel autoclave without an ignition source was charged with 2.3 L of pure water, 23 g of a compound represented by the following formula:

as an emulsifier and 0.2 g of ammonium carbonate as a pH adjuster. The air in the system was sufficiently replaced by nitrogen gas and the system was degassed. The temperature was increased to 50° C. while the system was stirred at 600 rpm, and then tetrafluoroethylene (TFE) and perfluoro(methyl vinyl ether) (PMVE) were added at a molar ratio of TFE/PMVE=24/76 so that the internal pressure was 0.8 MPa. Subsequently, 0.8 g of $CF_2=CFOCF_2CF(CF_3)OCF_2CF_2CN$ (CNVE) was injected under nitrogen pressure. An amount of 10 mL of an aqueous solution having an ammonium persulfate (APS) concentration of 1.2 g/mL was injected under nitrogen pressure such that the reaction was initiated.

When the internal pressure decreased to 0.7 MPa as the polymerization proceeded, 12 g of TFE and 13 g of PMVE were introduced under their own pressures. Thereafter, TFE and PMVE were similarly introduced as the reaction proceeded, so as to repeatedly increase and decrease the pressure in the range of 0.7 to 0.9 MPa. Also at this time, 1.5 g of CNVE was introduced under nitrogen pressure for each additional amount of 80 g of TFE and PMVE.

When the total amount of TFE and PMVE reached 680 g, the autoclave was cooled and the unreacted monomers were removed, whereby 3110 g of an aqueous dispersion having a solids concentration of 22 wt % was obtained.

The 3110 g of the aqueous dispersion was diluted with 3730 g of water, and the dilution was gradually added to 3450 g of an aqueous solution of 4.8 wt % nitric acid with stirring. The mixture was stirred for 30 minutes after the addition, the coagulum was collected by filtration, and the obtained polymer was rinsed with water and then dried under vacuum. Thereby, 680 g of a fluoroelastomer (A) was obtained.

The polymer was subjected to $^{19}$F-NMR analysis, and the monomer unit composition of the polymer was found to be TFE/PMVE/CNVE=59.3/39.9/0.8 (mol %). Also, the infrared spectroscopic analysis on the polymer showed a characteristic absorption of carboxyl groups at around 1774.9 cm$^{-1}$ and 1808.6 cm$^{-1}$, and a characteristic absorption of OH groups at around 3557.5 cm$^{-1}$ and 3095.2 cm$^{-1}$.

Example 1

The fluoroelastomer (A) containing a cyano group at an end (obtained in Preparation Example 1), polytetrafluoroethylene (trade name: L-5F, product of Daikin Industries, Ltd.), and azodicarbonamide [ADCA] (trade name: CELLMIC C-2, product of Sankyo Kasei Co., Ltd., decomposition temperature: 200° C. to 210° C.) were blended at a weight ratio of 100:20:0.3, and mixed with an open mill so that a curable composition was prepared.

The elastomer composition was press cross-linked (primarily cross-linked) for a period of time corresponding to T90 at 200° C. The press cross-linked composition was oven cross-linked (secondary cross-linked) for 18 hours at 290° C., and thereby an O-ring (AS-568A-214) was produced. The vulcanization curve of the curable composition at 200° C. was determined using a JSR-type Curelastometer II (product of Nichigo Shoji Co., Ltd.) so that the minimum viscosity (ML), vulcanization degree (MH), scorch time (TS2), induction time (T10), and optimum vulcanization time (T90) were determined. Also, occurrence of scorching was checked. Table 1 shows the results.

Example 2

The respective evaluations were performed as in Example 1 except that the curable composition prepared in Example 1 was stored for 30 days at a temperature of 25° C. and humidity of 50 to 60%.

Comparative Example 1

A curable composition was prepared by the same procedure as that in Example 1 except that urea (decomposition temperature: 133° C.) was used in place of ADCA. An O-ring (AS-568A-214) was produced by cross-linking by the same procedure as that in Example 1 except that the press cross-linking (primary cross-linking) was performed at a temperature of 180° C. Also, the respective evaluations were performed as in Example 1 except that the vulcanization curve was determined at 180° C. Table 1 shows the results.

Comparative Example 2

The respective evaluations were performed as in Example 1 except that the curable composition prepared in Comparative Example 1 was stored for 30 days at a temperature of 25° C. and humidity of 50 to 60%.

Comparative Example 3

A curable composition was prepared by the same procedure as that in Example 1 except that $Si_3N_4$ was used in place of ADCA. An O-ring (AS-568A-214) was produced by cross-linking by the same procedure as that in Example 1 except that the press cross-linking (primary cross-linking) was performed at a temperature of 180° C. Also, the respective evaluations were performed as in Example 1 except that the vulcanization curve was determined at 180° C. Table 1 shows the results.

Comparative Example 4

The respective evaluations were performed as in Example 1 except that the curable composition prepared in Comparative Example 3 was stored for 30 days at a temperature of 25° C. and humidity of 50 to 60%.

TABLE 1

|  | Example 1 | Example 2 After 30 days | Comparative Example 1 | Comparative Example 2 After 30 days | Comparative Example 3 | Comparative Example 4 After 30 days |
|---|---|---|---|---|---|---|
| Fluoroelastomer (Preparation Example 1) | 100 | 100 | 100 | 100 | 100 | 100 |
| PTFE (L-5F) | 20 | 20 | 20 | 20 | 20 | 20 |
| ADCA | 0.3 | 0.3 | — | — | — | — |
| Urea | — | — | 0.3 | 0.3 | — | — |
| $Si_3N_4$ | — | — | — | — | 0.3 | 0.3 |
| Primary vulcanization temperature (° C.) | 200 | 200 | 180 | 180 | 180 | 180 |
| Secondary vulcanization temperature (° C.) | 290 | 290 | 290 | 290 | 290 | 290 |
| ML (dNm) | 2.73 | 2.74 | 4.52 | 4.81 | 3.89 | No molded product obtained |
| MH (dNm) | 13.87 | 14.02 | 14.73 | 14.03 | 13.8 |  |
| TS2 (min) | 5.18 | 4.96 | 1.23 | 0.91 | 0.51 |  |
| T10 (min) | 4.26 | 4.09 | 0.56 | 0.49 | 0.39 |  |
| T90 (min) | 14.38 | 14.05 | 4.45 | 4.05 | 7.33 |  |

The results in Table 1 show that the curable composition according to Example 1 has a low ML and a long TS2, and thus has excellent storage stability and scorch resistance.

INDUSTRIAL APPLICABILITY

The curable composition of the present invention is excellent in storage stability and scorch resistance. Also, a molded product obtained by cross-linking the curable composition of the present invention is cross-linked by triazine cross-linking, and is therefore excellent in compression set and heat resistance. Such a molded product is also excellent in oxygen radical resistance and ozone resistance. The molded product can be particularly suitably used in applications exposed to oxygen radicals or ozone.

The invention claimed is:

1. A curable composition comprising
a fluoroelastomer (A) that contains a cyano group in a main chain and/or a side chain thereof, and
an amide compound (B) containing an azo structure,
the compound (B) producing $NH_3$ when decomposed, and
wherein the curable composition contains 0.1 to 20 parts by weight of the compound (B) for each 100 parts by weight of the fluoroelastomer (A).

2. The curable composition according to claim 1,
wherein the compound (B) is a compound represented by the following formula (1):

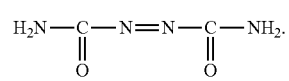

3. A molded product produced by cross-linking the curable composition according to claim 1.

4. The curable composition according to claim 1,
wherein the compound (B) has a decomposition temperature of 180° C. to 300° C.

5. A method for producing a molded product, comprising the steps of
primarily vulcanizing a curable composition, and
secondary vulcanizing the primarily vulcanized curable composition, wherein said curable composition comprises
a fluoroelastomer (A) that contains a cyano group in a main chain and/or a side chain thereof, and
an amide compound (B) containing an azo structure,
the compound (B) producing $NH_3$ when decomposed.

6. The method for producing a molded product according to claim 5,
wherein the primary vulcanization is performed at a temperature of 140° C. to 230° C., and the secondary vulcanization is performed at a temperature of 200° C. to 320° C.

* * * * *